(12) United States Patent
Volkl et al.

(10) Patent No.: US 11,090,142 B2
(45) Date of Patent: Aug. 17, 2021

(54) METHOD FOR PRODUCING A BLANK AND DENTAL RESTORATION

(71) Applicant: DENTSPLY SIRONA Inc., York, PA (US)

(72) Inventors: Lothar Volkl, Goldbach (DE); Martin Kutzner, Neuberg (DE); Heiner Horhold, Budingen (DE); Stefan Fecher, Johannesberg (DE)

(73) Assignee: DENTSPLY SIRONA INC., York, PA (US)

(*) Notice: Subject to any disclaimer, the term of this patent is extended or adjusted under 35 U.S.C. 154(b) by 64 days.

(21) Appl. No.: 15/388,040

(22) Filed: Dec. 22, 2016

(65) Prior Publication Data

US 2017/0181818 A1    Jun. 29, 2017

(30) Foreign Application Priority Data

Dec. 28, 2015 (DE) .................. 10 2015 122 864

(51) Int. Cl.
*A61C 13/00* (2006.01)
*A61C 13/083* (2006.01)
(Continued)

(52) U.S. Cl.
CPC ........ *A61C 13/0022* (2013.01); *A61C 13/081* (2013.01); *A61C 13/082* (2013.01);
(Continued)

(58) Field of Classification Search
CPC . A61C 13/0022; A61C 13/081; A61C 13/083; A61C 13/082; A61C 13/09;
(Continued)

(56) References Cited

U.S. PATENT DOCUMENTS 5,455,000 A * 10/1995 Seyferth ................. B22F 7/04
                                                    419/10
6,068,913 A *  5/2000 Cho ...................... B01J 3/062
                                                    428/212
(Continued)

FOREIGN PATENT DOCUMENTS

DE    102011055393 A1   5/2013
EP       3006418 A1    4/2016
(Continued)

OTHER PUBLICATIONS

International Search Report; PCT/ EP2016/082525; Mar. 3, 2017 (completed); dated Mar. 10, 2017.
(Continued)

*Primary Examiner* — Matthew M Nelson
(74) *Attorney, Agent, or Firm* — Dentsply Sirona Inc.

(57) ABSTRACT

The invention relates to a method for the preparation of a blank from a ceramic material, wherein at least two layers of ceramic material of different compositions are filled into a die layer-by-layer and after filling of the layers they are then pressed and sintered, wherein after filling of a first layer this is structured on its surface in such a way that the first layer, viewed across its surface, differs in its height from region to region, and then a layer with a composition that differs from the first layer is filled as a second layer into the mold.

11 Claims, 5 Drawing Sheets

(51) Int. Cl.
*A61C 13/08* (2006.01)
*A61C 13/09* (2006.01)
*B28B 1/16* (2006.01)
*B28B 11/24* (2006.01)
*C04B 35/488* (2006.01)
*C04B 35/645* (2006.01)
*C04B 37/00* (2006.01)

(52) U.S. Cl.
CPC ............ *A61C 13/083* (2013.01); *A61C 13/09* (2013.01); *B28B 1/16* (2013.01); *B28B 11/243* (2013.01); *C04B 35/4885* (2013.01); *C04B 35/645* (2013.01); *C04B 37/005* (2013.01); *C04B 2235/3218* (2013.01); *C04B 2235/3225* (2013.01); *C04B 2235/3246* (2013.01); *C04B 2235/9653* (2013.01); *C04B 2235/9661* (2013.01); *C04B 2237/068* (2013.01); *C04B 2237/348* (2013.01); *C04B 2237/64* (2013.01)

(58) Field of Classification Search
CPC ..... B28B 1/16; B28B 11/243; C04B 35/4885; C04B 35/645; C04B 37/005; C04B 2235/9661; C04B 2235/3225; C04B 2235/9653; C04B 2235/3218; C04B 2235/3246; C04B 2237/068; C04B 2237/64; C04B 2237/348
USPC ................... 433/199.1; 427/2.29; 501/134
See application file for complete search history.

(56) References Cited

U.S. PATENT DOCUMENTS

| | | | |
|---|---|---|---|
| 6,379,593 B1 | 4/2002 | Datzmann | |
| 7,981,531 B2 * | 7/2011 | Rheinberger | A61C 13/0003 428/701 |
| 8,025,992 B2 | 9/2011 | Engels | |
| 8,632,889 B2 | 1/2014 | Thiel | |
| 8,691,122 B2 | 4/2014 | Rheinberger | |
| 8,796,166 B2 * | 8/2014 | Holand | C04B 35/62655 501/103 |
| 8,936,848 B2 | 1/2015 | Jung | |
| 9,255,038 B2 | 2/2016 | Stephan | |
| 10,064,708 B2 * | 9/2018 | Burke | A61C 13/0004 |
| 2006/0008774 A1 | 1/2006 | Orth | |
| 2007/0292597 A1 * | 12/2007 | Ritzberger | A61K 6/813 427/2.29 |
| 2012/0196737 A1 * | 8/2012 | Holand | C04B 35/62886 501/134 |
| 2013/0221554 A1 * | 8/2013 | Jung | A61C 13/0006 264/16 |
| 2015/0282905 A1 * | 10/2015 | Jahns | C04B 35/63488 433/167 |
| 2016/0228222 A1 * | 8/2016 | Rolf | A61C 13/082 |
| 2016/0242881 A1 * | 8/2016 | Fisker | A61C 13/0004 |
| 2017/0181818 A1 | 6/2017 | Volkl | |

FOREIGN PATENT DOCUMENTS

| | | |
|---|---|---|
| JP | 2004035332 A * | 2/2004 |
| JP | 2004035332 A | 2/2004 |
| WO | 2013055432 A1 | 4/2013 |
| WO | 2013072287 A1 | 5/2013 |
| WO | 2014062375 A1 | 4/2014 |
| WO | 2014124874 A1 | 8/2014 |
| WO | 2014181827 A1 | 11/2014 |
| WO | 2017114772 A1 | 7/2017 |

OTHER PUBLICATIONS

Written Opinion of the International Search Report; PCT/ EP2016/ 082525; Mar. 3, 2017 (completed); dated Mar. 10, 2017.
International Preliminary Report on Patentability; PCT/ EP2016/ 082525; Mar. 3, 2017 (completed); dated Mar. 10, 2017.

* cited by examiner

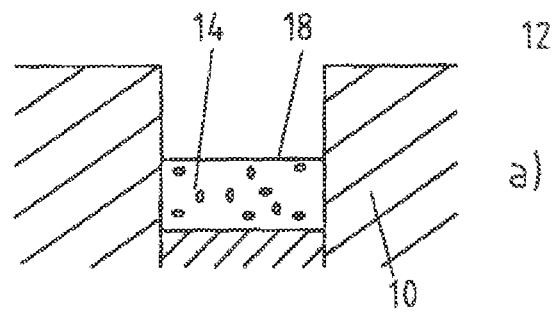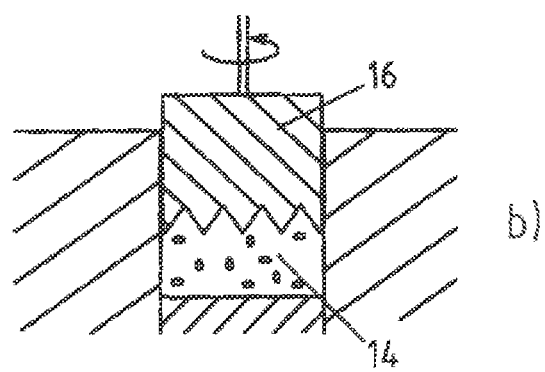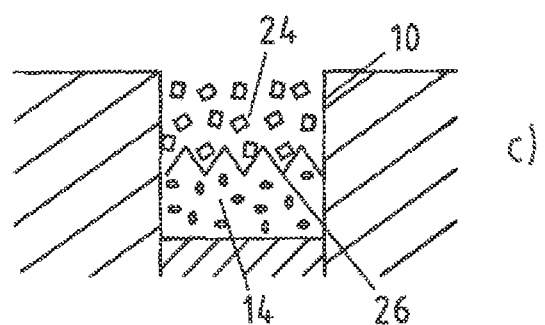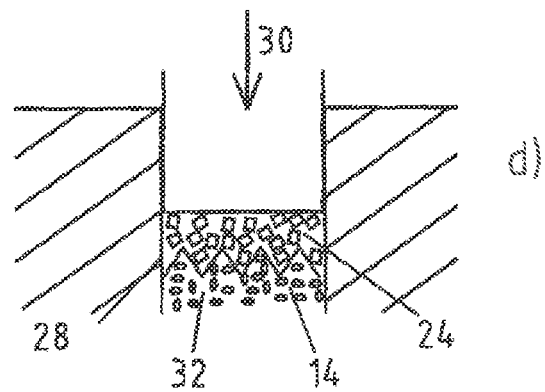
Fig. 1

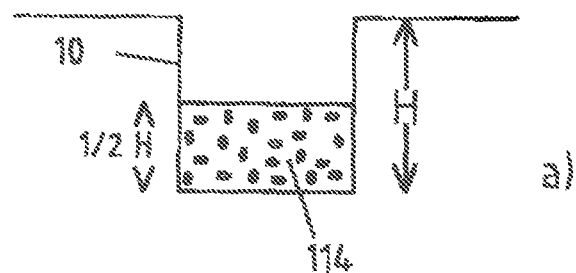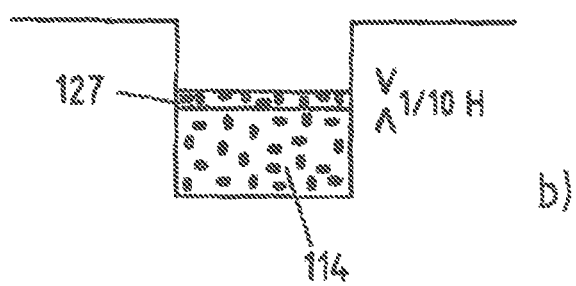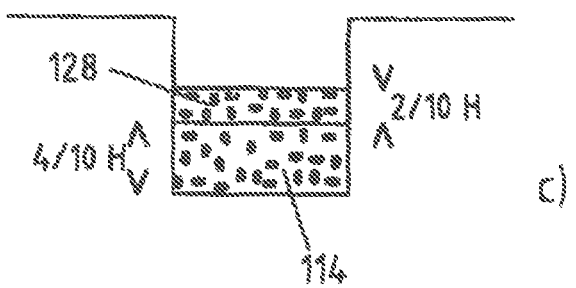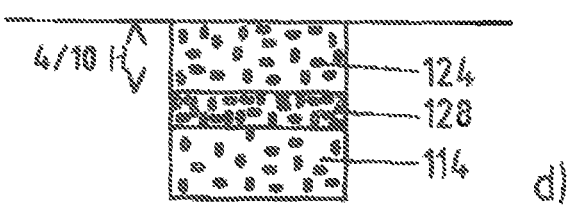
Fig. 5

METHOD FOR PRODUCING A BLANK AND DENTAL RESTORATION

THE CROSS-REFERENCE TO RELATED APPLICATIONS

This patent application claims the benefit of and priority to German Patent Application No. 10 2015 122 864.5, filed on Dec. 28, 2015, which is herein incorporated by reference for all purposes.

TECHNICAL FIELD

The invention relates, inter alia, to a method for the preparation of a blank from a ceramic material, in particular a blank to be used for the preparation of a dental restoration, wherein at least two layers of ceramic material of different compositions are filled into a mold layer-by-layer and the layers are then pressed and sintered.

The invention also relates to a pre-sintered or fully-sintered to be used for the preparation of a dental restoration, such as a dental framework, crown, partial crown, bridge, coping, veneer, abutment, pin construction, in particular crown, partial crown or bridge, comprising a ceramic material which in particular contains zirconium dioxide and when viewed across its height has layers of different compositions.

BACKGROUND

The subject of the invention is also a dental restoration, in particular crown, partial crown or bridge, prepared from a blank of ceramic material that has layers of different compositions.

U.S. Pat. No. 8,936,848 B2 discloses a blank of zirconium dioxide that is used for the preparation of a tooth replacement and comprises a number of layers of different chemical compositions. The individual layers thereby have different percentages of yttrium oxide.

A body of zirconium dioxide exhibits a decrease or increase in chromaticity along a straight line in the L*a*b* color space.

A blank of zirconium dioxide for the preparation of dental objects in accordance with WO 2014/062375 A1 has at least two material regions which have different proportions of tetragonal and cubic crystal phases, wherein in one of the regions the ratio is greater than 1 and in the other region the ratio is lower than 1.

EP 2 371 344 A1 relates to a ceramic body which is enriched with a stabilizing agent from the surface to a desired depth.

Zirconium dioxide is used as a ceramic material to produce dental restorations. A framework can be milled, for example, from a blank of zirconium dioxide and can then be sintered. In the following processing stages, a veneer is applied manually to the framework, wherein at least one incisor material is applied manually and fused. All of these process steps are time-consuming.

SUMMARY OF THE INVENTION

It is an object of the present invention to develop a method of the aforementioned type in such a way that the disadvantages of the prior art are avoided and in particular so that a dental restoration can be produced from a ceramic material without laborious post-processing, which satisfies aesthetic requirements and moreover is of high strength in regions under severe loads, such as the basal side of connectors of a bridge.

To achieve this aim the method outlined above is developed further so that after filling of a first layer, the layer is provided with a surface structure such that when viewed along its surface comprises regions of different heights, i.e., it does not have a uniform fill height, and a second layer that differs from the first layer in its composition is then filled into the mold.

As an alternative, an intermediate layer with a different composition compared to the first layer is filled into the die on top of the first layer and both layers are mixed before the second layer is then filled into the die. It is in particular provided for the material of the intermediate layer to be mixed with the material of the first layer starting from the free surface of the intermediate layer over a height, which is twice or approximately twice the height of the intermediate layer. Furthermore, it is in particular provided for the material of the intermediate layer to be the same material as that used for the second layer.

In accordance with the invention, for the first alternative initially a first layer of material in pourable condition is filled into a die. This material may be a tooth-colored zirconium dioxide granular material that, for example, has a bulk density between 1 g/cm$^3$ and 1.4 g/cm$^3$, preferably in the range between 1.15 g/cm$^3$ and 1.35 g/cm$^3$. After filling of the granular material, which can have a grain size D50 between 40 μm and 70 μm, the surface is smoothed, and then to shape or form a structure that has depressions (valleys) and elevations which in particular extend parallel to one another, in particular however, concentric or parallel to one another. For this purpose it is in particular provided that the structure is formed through an element that moves relative to the first layer, in particular rotates relative to the first layer, that in particular with a wave-like, comb-like or saw-tooth-like section structures the first layer in its surface region. There is a quasi "raking" of the surface to form the structure with alternating elevations and valleys.

In particular the structure is to be formed such that the volume of the elevations is equal to, or approximately equal to, that of the depressions or valleys.

The saw-tooth-like element preferably has V-shaped teeth that are symmetrical in shape and has flanks that enclose an angle between 15° and 45°. The distance between neighboring teeth, i.e., the distance from peak to peak, should be between 1 mm and 4 mm, preferably between 1 mm and 3 mm.

The pourable second ceramic material is then filled into the mold, and increases in quantity starting from the troughs that form the valleys of the structure, so that as a consequence, there is a virtually constant increase in the percentage of the second layer across the height of the elevations. After smoothing of the surface the layers are compressed to achieve an approximate density in the region of 3 g/cm$^3$. Pre-sintering is then carried out at a temperature between 700° C. and 1100° C., in particular in the range between 800° C. and 1000° C. for a time between, for example, 100 and 150 minutes. The blank so produced is then worked, for example, through milling and/or grinding to yield a desired dental restoration that is then sintered until a final density can be attained that for zirconium dioxide, for example, is in the range 6.0 to 6.1 g/cm$^3$.

Complete/final sintering to full density is carried out, for example, for a time between 10 minutes and 250 minutes at a temperature in the range 1300° C. to 1600° C. Complete sintering may also be carried out at a somewhat higher temperature. If sintering is carried out at a temperature that is, for example, 100° C. higher than that given by the manufacturer of the starting material, then this is referred to as over-sintering, with a sintering time corresponding to that given for complete sintering.

Complete sintering is in particular carried out in the range 1350° C. to 1550° C., wherein densities between 6.0 and 6.1 g/cm$^3$, in particular between 6.04 and 6.09 g/cm$^3$ can be achieved.

The penetration of the layers results in the advantage that different physical and optical properties can be achieved across the height of the blank. Thus, once the first layer is colored to the required extent, a tooth-colored edge region can be obtained after complete sintering, across the transition region formed by the penetrating first and second layer materials, in which the intensity of the tooth color decreases continuously and at the same time the translucency increases in the desired manner. The dental restoration is then produced from the blank, in particular by milling, taking into account the course of the layer, wherein the dental restoration is "laid" in the blank such that the tooth incisor extends in the region of the second layer.

Independently thereof, a continuous transition between the layers is provided on the basis of the teaching of the invention, so that color/translucency decreases or increases continuously and also the bending strength can be adjusted in such a way that the region of the dental restoration, which is subject to a extensive loading, has a higher bending strength than the regions which are not so heavily loaded. In this case there is no abrupt transition, but as mentioned a continuous, i.e., uniform, quasi-continuous one, over the height of the dental restoration to be produced, a possibility not known from the prior art; since either layers of different compositions are arranged one above the other, so that a step-like, abrupt change results, or exclusively from the outer surface there is a change in the material properties, i.e., over the entire dental restoration and not over its height.

In a preferred manner, the possibility of mixing the layer materials is provided by rotating an element, in particular, about an axis extending along the longitudinal axis of the mold, in order to achieve the structure, which is also referred to as a wave-like or saw-tooth-like structure, by displacing material of the surface of the layer. There is also the possibility of forming the structure by means of a pressure element which acts on the first layer in the direction of the surface and which has, in particular, elevations extending in its surface with depressions extending between them so that the negative form of the element, also referred to as a stamp, is impressed into the surface of the first layer. Then, as explained above, the ceramic material of the second layer is filled and then smoothed to press the layers together and then pre-sinter the pressed object.

The ceramic material used is in particular one which contains zirconium dioxide doped with yttrium oxide ($Y_2O_3$), calcium oxide (CaO), magnesium oxide (MgO) and/or cerium oxide ($CeO_2$), but in particular with yttrium oxide, wherein the material of the first layer differs from that of the second layer in terms of color and/or crystal form stabilized at room temperature.

Furthermore, the invention provides for the material of the first and/or second layer to be colored with at least one color-imparting oxide from elements of the group Pr, Er, Fe, Co, Ni, Ti, V, Cr, Cu, Mn, Tb, preferably $Fe_2O_3$, $Er_2O_3$ or $Co_3O_4$.

The invention is also characterized in that the first and the second layer are mutually penetrated in their superposed regions across a height H which is a 1/15 to a quarter, in particular 1/10 to 1/5, of the total height of the first and second layers.

The first layer should have a height in an unstructured state which corresponds approximately to 1/2 to 2/3 of the sum of the first and second layers.

In order that the first layer is characterized by a high strength and the second layer is translucent to the desired extent, the invention provides for the percentage of yttrium oxide in the first layer to be 4.7 wt % to 7.0 wt %, and/or for the percentage in the second layer to be between 7.0 wt % and 9.5 wt %, wherein the percentage of yttrium oxide in the first layer is less than that in the second layer.

Furthermore, the ratio of the tetragonal phase to the cubic phase of the zirconium dioxide should be 1 in the first layer as well as in the second layer after pre-sintering.

In particular, the zirconium dioxide has at least a 95% tetragonal crystal form in the first layer. In the second layer, the tetragonal crystal phase should be between 51% and 80%. The remainder should be, in particular, of the cubic crystal phase.

The base material for the first and second layers preferably has the following composition in percentage by weight:

| | |
|---|---|
| $HfO_2$ | <3.0 |
| $Al_2O_3$ | <0.3 |

Technically caused unavoidable components ≤0.2 (such as $SiO_2$, $Fe_2O_3$, $Na_2O$)

| | | |
|---|---|---|
| For the first layer: | $Y_2O_3$ | 4.5 to 7.0 |
| For the second layer: | $Y_2O_3$ | 7.0 to 9.5 |
| Color-imparting oxides: | | 0-1.5 |

$ZrO_2$=100−($Y_2O_3$+$Al_2O_3$+$HfO_2$+unavoidable components+color-imparting oxides)

The invention is characterized, inter alia, by the following measures. First, a first tooth-colored, ceramic material, which consists predominantly of zirconium dioxide, is filled into a mold. The filling height corresponds approximately to 1/2 to 2/3 blank height before pressing.

The surface is then structured by a specially structured element or a stamp, wherein the structure can be designed such that there is a continuous transition of the properties from the first material to the second material. Also, the surface geometry of the first layer can be aligned with the diffusion coefficients of the layer materials.

Preferably, a rotating element is used which is lowered into the mold, i.e., into the die, in which the first layer is located, and then is immersed into the first layer to the extent required. The surface is selectively structured by rotating the element, which is structured on the layer side like a wave-like or comb-like element. Alternatively, the surface may be structured by a press plunger with a suitable geometry.

Subsequently, the die is filled with the second, in particular, less-colored ceramic material, having preferably a higher translucency and also a higher $Y_2O_3$ content. The usual pressing of the ceramic materials and pre-sintering then takes place.

There is also no departure from the invention if a material for forming an intermediate layer is then filled into the die after the filling of the first layer, which is preferably colored correspondingly to a tooth color and is predominantly zirconium dioxide. This material should be less colored than the first material and also essentially consists of zirconium dioxide, with a yttrium oxide content higher than that of the first layer. The intermediate layer may, for example, have a height of 1/10 to 1/5 of the total height of the layers to be filled into the die. The intermediate layer material is then mixed with the first layer. In this case, mixing takes place with an element which at least penetrates into the first layer to a depth which corresponds to the height of the intermediate layer. Then, a layer corresponding to the previously described second layer is filled into the die, which leads to a higher translucency and should have a higher yttrium oxide content than the first layer. As explained above, the ceramic materials are then pressed to a blank and pre-sintered to obtain, in particular, a dental restoration from the blank so produced by milling. A further processing step is complete sintering to full density. The material of the intermediate layer should be that of the second layer.

Independently of the method described above, a monolithic dental restoration, which does not have to be veneered, is obtained after complete sintering, although applying a veneering step is not a departure from the invention.

A pre-sintered or fully-sintered blank for use in the manufacture of a dental restoration, such as a dental framework, crown, partial crown, bridge, coping, veneer, abutment, pin construction, consisting of a ceramic material containing in particular zirconium dioxide, and having layers of different compositions across its height, is characterized in that the blank has three layers, of which one middle layer extending over at least 1/10 to 1/5 of the height of the blank consists of a material of the first layer and a material of the second layer or of an intermediate layer material. The invention is characterized in particular by the fact that in the middle layer, the proportion of the material of the first layer is continuously or substantially continuously decreasing in the direction towards the second layer.

In accordance with the invention, there is a continuous transition between the first and second layer so that, as a result, a continuous change in the color and translucency is possible. Also, by means of such measures, it is possible to obtain strength values to the desired extent, in particular in those regions which are subject to a high load, such as the basal side of connectors of bridges, if they are carved out of the region of the blank in which the first layer extends and which has the highest strength.

In particular, it is provided that the ceramic material contains at least 85% by weight of zirconium dioxide doped with yttrium oxide, the proportion of yttrium oxide in the first layer being up to 7.0% by weight and the proportion of yttrium oxide in the first layer is lower than in the second layer.

In a further development of the invention, the first layer and the second layer are differently colored and/or doped with yttrium oxide in such a way that the fully-sintered restoration has a higher strength viewed in the tooth axis direction on the root side than on the incisal side and/or on the incisal side has a higher translucency than on the root side.

A dental restoration, in particular crown, partial crown or bridge, prepared from a blank of the type described above, is characterized in particular in that when viewed in the tooth axis direction has at least one first layer extending on the root side, a second layer extending on the incisal side and a middle layer extending between them, which decreases in strength and/or increases in translucency from the first layer in the direction of the second layer continuously or substantially continuously.

On the basis of the teaching according to the invention, a dental restoration can be produced inexpensively and reproducibly without the need to manually apply a veneering ceramic to the incisor side. It is thereby possible to adjust the strength through the composition of the ceramic materials in such a way that the highest bending strength can be achieved in the region of high loading.

Further details, advantages and characteristics of the invention result not only from the claims and their features, both by themselves and/or in combination, but also from the following description of the preferred exemplary embodiments.

BRIEF DESCRIPTION OF THE DRAWINGS

Figures

FIG. 1a) to d) shows a schematic of an assembly and the process steps that can be carried out with it.

DETAILED DESCRIPTION OF THE INVENTION

The teaching according to the invention is made clear by reference to the figures, in which identical elements are provided with the same reference symbols. On the basis of the teaching, in particular, dental restorations are produced from a ceramic material that have a monolithic structure such that an immediately usable monolithic tooth replacement is obtained after complete sintering. For this purpose, in accordance with the invention, a blank is produced which consists of several layers of ceramic material with differing compositions, by means of which, according to the dental restoration to be produced, in particular desired optical and mechanical properties can be obtained which lead to a direct usable dental replacement without, for example, the need for material to be applied by hand and fired after complete sintering. In addition, desired strength values are achievable in the regions in which high loads occur, as in connector basal side of bridges.

Figure 2:
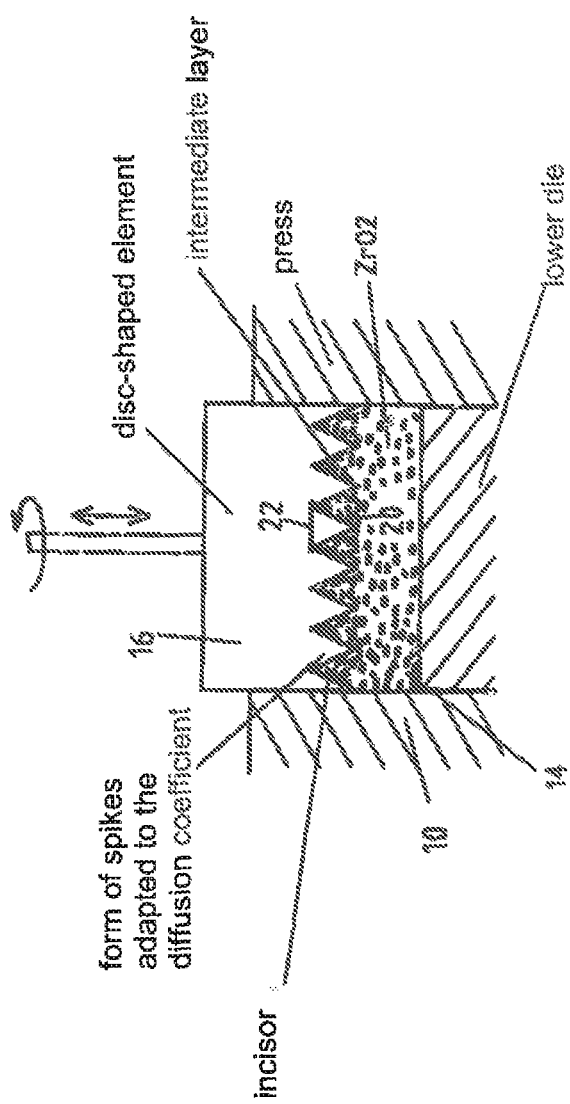
FIG. 2 shows the assembly shown in FIG. 1b) in greater detail, FIG. 3a) to d) shows schematics to illustrate blank characteristics.

With reference to FIGS. 1 and 2, the production of a blank from which a corresponding dental restoration can be produced is described. Thus, as shown in FIG. 1a) a first material 14 is filled into the die 10 of a press 12, said material, in particular, being zirconium dioxide stabilized with yttrium oxide, may have the following composition in percentage by weight:

| | |
|---|---|
| $HfO_2$ | <3.0 |
| $Al_2O_3$ | <0.3 |
| Technically caused, unavoidable components ≤0.2 (such as $SiO_2$, $Fe_2O_3$, $Na_2O$) | |
| $Y_2O_3$ | 4.5 to 7.0 |
| Coloring oxides: | 0-1.5 |
| $ZrO_2$ = 100 − ($Y_2O_3$ + $Al_2O_3$ + $HfO_2$ + unavoidable components + color-imparting oxides) | |

Subsequently, a second layer 24 is filled into the die 10 (FIG. 1c), wherein the total height of the layers 14 and 24 is equal to twice the height of the layer 14 in the unstructured state without restriction of the teaching according to the invention. The second layer may have the following composition in percentage by weight:

| | |
|---|---|
| $HfO_2$ | <3.0 |
| $Al_2O_3$ | <0.3 |
| Technically caused, unavoidable components ≤0.2 (such as $SiO_2$, $Fe_2O_3$, $Na_2O$) | |
| $Y_2O_3$ | 7.0 to 9.5 |
| Color-imparting oxides: | 0-1.5 |
| $ZrO_2 = 100 - (Y_2O_3 + Al_2O_3 + HfO_2 +$ unavoidable components + color-imparting oxides) | |

The color-imparting oxides are in particular members of the group Pr, Er, Fe, Co, Ni, Ti, V Cr, Cu, Mn, Tb, preferably $Fe_2O_3$, $Er_2O_3$ or $CO_3O_4$.

If the first layer 14 preferably has a height which corresponds to half the total height H of the first and second layer 14, 24, then the height of the first layer 14 can also be ½ H to ⅔ H and thus that of the second layer 24 ⅓ H to ½ H.

The smoothed surface is then structured according to step b). For this purpose, for example, a disc-shaped or plate-shaped or web-shaped element 16 is used, which in the example embodiment has a toothed geometry on the layer side, so that a corresponding negative structure is formed in the surface 18 of the layer 14 by displacing material. This structure is represented by concentrically extending elevations and surrounding valleys. The distance between the elevation (peak) and the valley (depression), i.e., the clear distance between the projection 20 and the valley bottom 22 according to FIG. 2, should be approximately ⅕ of the height of all layers.

In particular, it is provided that the structure is formed such that the volume of the elevations is equal to or approximately equal to the volume of the depressions or valleys.

Since the material of the second layer 24 penetrates to the base of the valleys 26 in the surface 18 of the layer 14, there is a continuous transition between the properties of the layer 14 and the layer 24, after the layers 24, 14 have been pressed according to FIG. 1d). The transition or intermediate layer is denoted by the reference numeral 28 in FIG. 1d).

The layer 24 consists of a material which differs from that of the layer 14. The difference lies, in particular, in the color additives and in the proportion of yttrium oxide. The latter is selected in such a way that the proportion of the cubic crystal phase in the layer 24 after pre-sintering is considerably greater than that in the layer 14. In layer 14, the tetragonal crystal phase fraction is more than 90%, while the cubic crystal phase fraction in layer 24 is between 30% and 49%. The remainder is essentially the tetragonal crystal phase.

These different crystal phase fractions result from the fact that the yttrium oxide content in the layer 14 is between 4.5% and 7% by weight and in the layer 24 between 7% and 9.5% by weight, wherein the proportion in the first layer 14 is less than in the second layer 24.

The color oxide fraction in the layer 24 is reduced compared to layer 14, being in the range from 0.0 to 1.5% by weight, preferably from 0.005 to 0.5% by weight. As a result of this measure, there is a continuous color transition between the layers 14 and 24. Due to the higher yttrium oxide content, the bending strength is reduced and there is also a higher translucency in the layer 24 compared to the layer 14.

Figure 4:
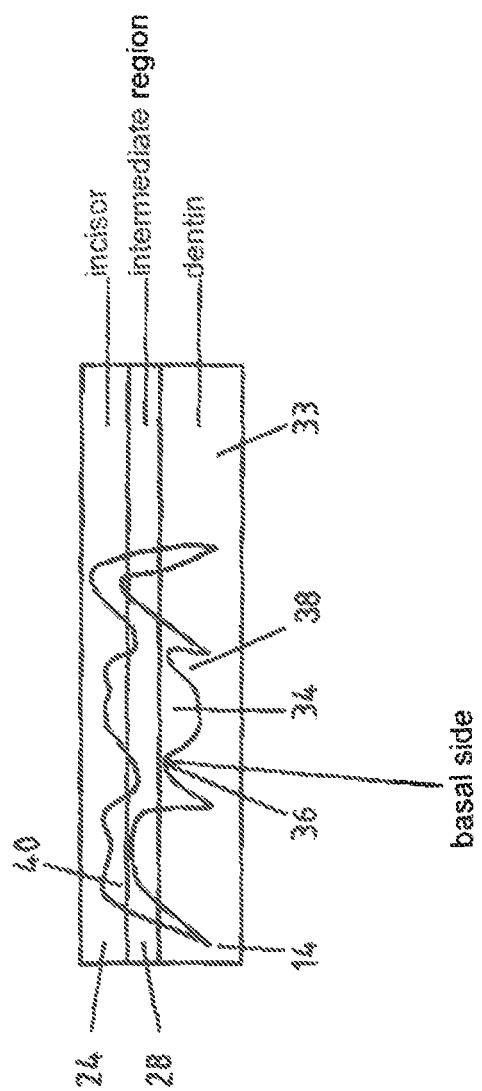
FIG. 4 shows a schematic of the bridge to be prepared from a blank according to FIG. 3, and FIG. 5a) to d) shows a schematic of an alternative method.

The highest strength is seen in the layer 14, in which the regions of the dental replacement which are subject to heavy loads, in particular the connector undersides of bridges, extend as shown in FIG. 4.

The layers 14, 24 are pressed by means of a stamp 30, with a pressure between 1000 bar and 2000 bar.

The pourable material, i.e., in the state in which it is filled into the die 10, has a bulk density between 1 $g/cm^3$ and 1.4 $g/cm^3$. After pressing, the density is approximately 3 $g/cm^3$.

As a result of the structuring, a density of up to 2 $g/cm^3$ is obtained in the transition region between the unmixed regions of the first and second layers 14, 24 before the layers 14 and 24 are compacted. The transition region can also be referred to as middle layer 28.

After pressing, the produced blank 33 is ejected from the mold 10 and pre-sintered in the customary manner at a temperature of between 800° C. and 1000° C. for a period of time between 100 minutes and 150 minutes. A corresponding blank is also shown in FIG. 4. The blank 33 comprises the compressed layer 14, the compressed layer 24 and the compressed middle layer 28, i.e., the transitional region.

If a dental replacement is milled from the blank 33—in the example embodiment a bridge 34—then the milling program is designed in such a way that the lower region of the bridge 34, in particular, in the region of the connector's basal side 36, extends into the layer 14 that has the highest bending strength. The incisal region 40 of the bridge, by contrast, extends into the layer 24.

In the transition region, i.e., in the middle layer 28, in which the quasi-continuous or continuous transition takes place between the layers 14 and 24, there is the transition between the dentin and the incisor region. The dentin extends in the region 14.

Figure 3:
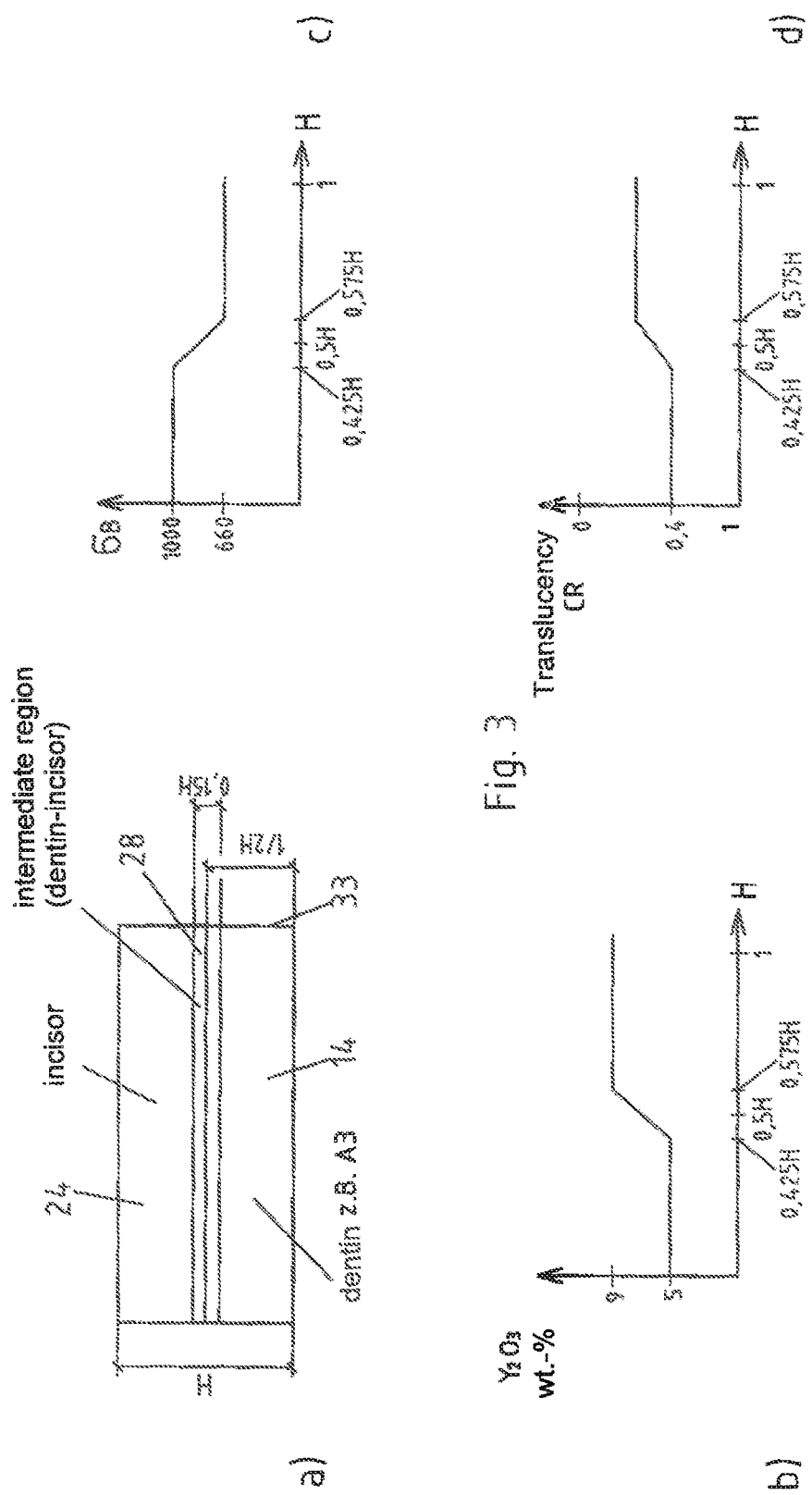

Essential features of the teaching according to the invention are once again illustrated with reference to FIG. 3. Thus, FIG. 3 shows once again the blank 33 with the layers 14 and 24, as well as the transition region 28.

FIG. 3b is intended to illustrate that the stabilizing agent in the form of yttrium oxide is approximately 5% by weight in the first layer 14 and approximately 9% by weight in the second layer 24, and that on the basis of the arrangement of the intermediate layer 28 according to the invention the percentage of yttrium oxide increases continuously. The values 0.425H and 0.575H illustrate that the element 16 shown in FIGS. 1 and 2 is placed in the first layer 14 in such a way that valleys are formed which extend with respect to the total height H of the layers 14, 24 in a region from 0.075H beneath the surface 18 and the elevations or peaks extend in a region from 0.075H above the surface 18, wherein as mentioned the distance between the peaks 20 and valleys 22 of the saw-tooth-shaped structure of the element 16 is 0.15H.

Measurements of fully sintered layers 14 and 24 in accordance with DIN ISO 6872 have shown that the bending strength GB in layer 14, in which more than 80% of the tetragonal crystal phase of the zirconium dioxide is present, is approximately 1000 MPa. By contrast, the flexural strength in layer 24, in which 30 to 49% cubic crystal phase is present, is approximately 660 MPa.

FIG. 3d shows the change in the translucency across the height of the layers 14, 24.

With reference to FIG. 5 an alternative method, which follows the teaching according to the invention, wherein a blank or a dental restoration is to be prepared which provides a largely continuous transition between a first layer and a second layer or in the case of a restoration between the dentin region and incisal region in terms of translucency and strength.

Thus, according to FIG. 5a, a first ceramic material, which corresponds to the layer 14 according to FIG. 1, is first filled into a die 10. The corresponding layer in FIG. 5a is indicated by the numeral 114. The height of this layer may be half the height of the total layers which are filled into the die 10. A layer 127 with a thickness which in the example embodiment is 1/10 of the total height of the layers is then applied to the layer 114. The material of the layer 127 can correspond to that of the second layer 24 according to FIG. 1. The layer 127 is then mixed with a surface region of the layer 114 over a depth corresponding to the thickness of the layer 127. This forms an intermediate layer 128 having a thickness of 2/10 of the total height of the layers. A further layer 124, which corresponds to the second layer 24 according to FIG. 1, is then applied to the intermediate layer 128. The height of the layer 124 in the example embodiment is thus 4/10 of the total height H. The layers 124, 128, 114 are then pressed together in accordance with the example embodiment of FIG. 1 to enable performance of the process steps pre-sintering, working and complete sintering as described. Working can naturally be carried out after complete sintering.

The invention claimed is:

1. A method for producing a blank from a ceramic material, comprising the steps of:
   filling a die with at least two layers of ceramic materials of different compositions in pourable condition layer-by-layer;
   pressing the at least two layers of ceramic materials of different composition; and
   sintering the pressed at least two layers of ceramic materials of different compositions,
   wherein after filling of a first layer of a first ceramic material in pourable condition, a surface of the first layer is structured in such a way that the first layer when viewed across the surface, the surface differs from region to region in height in such a way that elevations and depressions or valleys are formed, and
   wherein a layer of a second ceramic material in pourable condition with a composition that is different from that of the first layer is filled into the die to form a second layer,
   wherein filing the die with the second ceramic material, a portion of the second ceramic material is disposed within the depressions or valleys formed between the elevations the first ceramic material along the structured surface of the first layer to form an intermediate layer having both the first ceramic material and the second ceramic material, the intermediate layer being located between the first layer having the first ceramic material and the second layer having the second ceramic material; and
   wherein the height of the intermediate layer is 1/10 to 1/5 of the total height of the at least two layers to be filled into the die.

2. The method according to claim 1, wherein the surface of the first layer is structured in such a way that result in the elevations, with the depressions or valleys that are demarcated from the elevations.

3. The method according to claim 1, wherein a ring structure is formed in the surface when viewed from above, which shows concentrical elevations and depressions.

4. The method according to claim 1, wherein the structure is produced by an element that moves in relative to the first layer and which structures the first layer in its surface region by means of a section which has a wave-like, comb-like or saw-tooth-like shape.

5. The method according to claim 1, wherein the structure is generated by a pressure element that acts in the direction of the surface of the first layer.

6. The method according to claim 1, wherein the pressure element used is such that elevations extending concentrically or parallel are pressed into the surface of the first layer with depressions extending between them.

7. The method according to claim 1, wherein the structure is formed such that the volume of the elevations is equal to, or approximately equal to, the volume of the depressions.

8. The method according to claim 1, wherein the materials used as ceramic materials include zirconium dioxide doped with yttrium oxide ($Y_2O_3$), calcium oxide (CaO), magnesium oxide (MgO) and/or cerium oxide ($CeO_2$), wherein the material of the first layer differs from the material of the second layer in terms of color and/or the proportions of stabilized crystal forms present at room temperature.

9. The method according to claim 1, wherein the first layer in an unstructured state has a height that is half, or approximately half the total height H of the first and second layers.

10. The method according to claim 1, wherein the material used as the first and/or second ceramic material is one in which the percentage of yttrium oxide in the first layer is 4.5 wt % to 7.0 wt % and/or the percentage in the second layer is 7.0 wt % to 9.5 wt %, wherein the percentage of yttrium oxide in the first layer is lower than in the second layer.

11. The method according to claim 1, wherein prior to the step of sintering, the method further comprises the step of pre-sintering the pressed at least two layers of ceramic materials of different compositions such that the ceramic material used for the first layer and the second layer is one in which the ratio of tetragonal crystal phase to cubic crystal phase of the zirconium dioxide both in the first layer and in the second layer after pre-sintering is 1.

* * * * *